W. H. KEMPTON.
PROCESS OF MAKING TUBES.
APPLICATION FILED MAY 2, 1917.
1,284,363.
Patented Nov. 12, 1918.
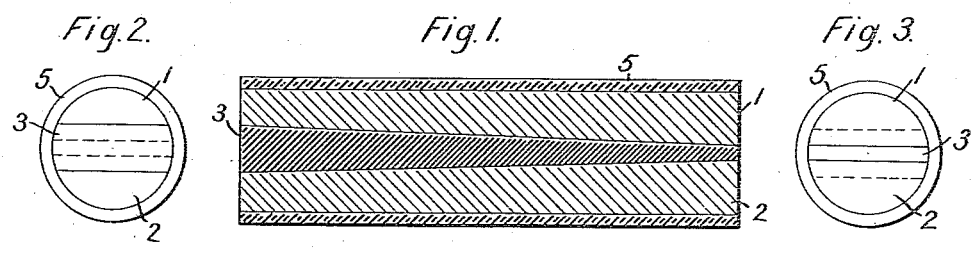
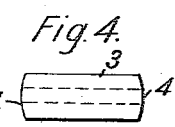
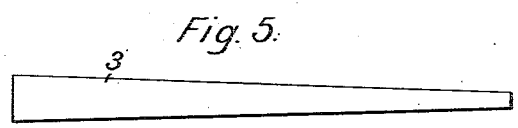
WITNESSES:
INVENTOR
Willard H. Kempton
BY
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

PROCESS OF MAKING TUBES.

1,284,363.    Specification of Letters Patent.    Patented Nov. 12, 1918.

Application filed May 2, 1917. Serial No. 165,866.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Processes of Making Tubes, of which the following is a specification.

My invention relates to the manufacture of tubes consisting of superposed convolutions of absorbent sheet material united by means of suitable binders, and it has for its object to provide a method of making a strong and uniform tube of the above-indicated character by subjecting the convolutions to heat and simultaneously applying pressure to the entire surface of the innermost convolution.

In the accompanying drawing, Figure 1 is a longitudinal central sectional view showing a mandrel suitable for use in practising my process, the mandrel being shown in its expanded position and associated with a tube under treatment. Fig. 2 is an end elevational view of the same structure, as seen from the left of Fig. 1. Fig. 3 is an elevational view of the same structure, as seen from the right of Fig. 1. Fig. 4 is an end elevational view of the central wedge constituting a portion of the expanding mandrel, and Fig. 5 is a side elevational view of the same wedge.

Tubes have heretofore been made by treating absorbent sheet material, such as paper or cloth, with a binder, winding the treated material upon mandrels and applying heat and pressure to the superposed convolutions in order to transform them into homogeneous and compact tubes. One method which has been employed for applying pressure for this purpose consists in winding the tube upon an expanding mandrel or by transferring the wound tube from the mandrel upon which it is wound to an expanding mandrel and then causing the mandrel to expand in order to develop the necessary pressure upon the walls of the tube. The expanding mandrels which have been used for this purpose have been of such construction that, when they were finally expanded, the pressure-applying surfaces of the mandrel engaged the tube walls in a discontinuous manner, leaving areas of the tube walls untouched and, consequently, rendering the finished tubes of non-uniform density.

According to my present invention, I carry out the process outlined above by means of a mandrel which, in its completely expanded position, assumes a substantially cylindrical form of the diameter which it is desired to impart to the interior of the tube and which therefore applies pressure equally to all portions of the tube wall. One simple form of mandrel which is suitable for this purpose is shown in the accompanying drawing and comprises two side pieces 1 and 2 which are of segmental cross section and which taper uniformly from end to end. A wedge member 3 is inserted between the side pieces 1 and 2, the wedge being provided with flat tapering sides corresponding in inclination to that of the side pieces and having curved edges 4, the curvature of which is the same as the curvature of the side pieces.

In the operation of the device which I have shown and described, the side pieces 1 and 2 are inserted in the tube 5 which may be composed of wound convolutions of paper and a binder or of any other suitable material that can be compacted by pressure, and the wedge 3 is thrust between the side pieces and driven firmly into place, the final relation of the wedge and side pieces being that shown in Figs. 1, 2 and 3 of the drawing, in which the wedge and the side pieces coöperate to form a substantially continuous cylinder, pressure being applied equally to all points of the inner walls of the tube 5.

If the binder employed in the tube 5 is of a kind that hardens under the influence of heat and pressure, heat is applied during the pressing operation, such heat being applied either externally or by means of heating elements, heated electrically or otherwise, inclosed within the members composing the expanding mandrel. Suitable binders for use in making tubes according to my process consist of condensation products of phenols and formaldehyde but it is to be understood that my invention is not restricted to the use of such binders, since shellac, copal, kauri, acaroids and other varnish gums and gum-resins may be employed as the binders if desired. It is also to be understood that the structure which I have shown and described is intended to be merely illustrative and not as imposing restrictions upon my invention which is limited only by the scope of the appended claim.

I claim as my invention:

The process of making tubes that comprises winding into tubular form a plurality of convolutions of fibrous sheet material associated with a phenolic condensation product, applying substantially uniform mechanical pressure to the entire surface of the inner wall of the resulting tubular body, and heating the said tubular body while subjected to such pressure.

In testimony whereof, I have hereunto subscribed my name this 19th day of April 1917.

WILLARD H. KEMPTON.